United States Patent [19]

Tsuwako et al.

[11] Patent Number: 5,696,643

[45] Date of Patent: Dec. 9, 1997

[54] DISK DRIVE APPARATUS AND READ ERROR RECOVERY METHOD IN A DISK DRIVE APPARATUS

[75] Inventors: Kazushi Tsuwako, Machida; Fujio Harako, Fujisawa; Katsumi Suda; Michio Nakajima, both of Sagamihara; Isao Yoneda, Yokohama; Kenji Ogasawara, Fujisawa, all of Japan

[73] Assignee: International Business Machines Corporation, Armonk, N.Y.

[21] Appl. No.: 632,787

[22] Filed: Apr. 17, 1996

[30] Foreign Application Priority Data

Apr. 20, 1995 [JP] Japan .................................. 7-094711

[51] Int. Cl.⁶ .................................................. G11B 15/46
[52] U.S. Cl. ................................. 360/73.03; 360/75
[58] Field of Search ................................. 360/75, 73.03, 360/137, 73.01, 70, 31, 105, 109, 113

[56] References Cited

U.S. PATENT DOCUMENTS

| | | | |
|---|---|---|---|
| 4,635,139 | 1/1987 | Nguyen et al. | 368/25 |
| 4,669,011 | 5/1987 | Lemke | 360/103 |
| 5,233,482 | 8/1993 | Galbraith et al. | 360/46 |
| 5,461,521 | 10/1995 | Ito et al. | 360/75 |
| 5,527,110 | 6/1996 | Abraham et al. | 360/75 X |
| 5,537,034 | 7/1996 | Lewis | 324/212 |
| 5,612,830 | 3/1997 | Gregory et al. | 360/71 X |

FOREIGN PATENT DOCUMENTS

| | | | |
|---|---|---|---|
| 010594 | 4/1984 | European Pat. Off. | 360/75 |
| 0044123 | 4/1981 | Japan | 360/75 |
| 0184679 | 8/1987 | Japan | 360/75 |
| 0528472 | 2/1993 | Japan . | |

OTHER PUBLICATIONS

PATENTS ABSTRACTS OF JAPAN, vol. 17, No. 311, P-1556, Jun. 14, 1993.
IBM Technical Disclosure Bulletin, vol. 34, No. 11, Apr. 1992, pp. 217–219.

*Primary Examiner*—Andrew L. Sniezek
*Attorney, Agent, or Firm*—Matthew J. Bussan

[57] ABSTRACT

A disk drive apparatus and read error recovery method in a disk drive apparatus removes thermal asperities on disk surfaces. A projection, such as a thermal asperity, on the recording surfaces of disks is detected when a signal transducer contacts the projection. The flying height of the signal transducer is lowered, e.g., by reducing the disk rotation speed from the normal rotation speed in read/write operations, while the signal transducer is positioned over the detected projection on the track. The signal transducer strikes the projection to break the projection. This avoids a subsequent error from being caused by the thermal asperity.

16 Claims, 4 Drawing Sheets

DISK DRIVE APPARATUS AND READ ERROR RECOVERY METHOD IN A DISK DRIVE APPARATUS

BACKGROUND OF THE INVENTION

1. Technical Field

This invention relates to a disk drive apparatus and, more specifically, to a disk drive apparatus and method for eliminating read errors on the disk surface, which are caused by projections, such as thermal asperities.

2. Description of the Prior Art

A magnetic disk drive apparatus is an apparatus for recording and reading data on the surfaces of disks through the use of a changing magnetic field. A transducer head is positioned over a specific position on a disk track on which data is recorded, and reads or writes data on the track of the disk spinning at high speed. The head is slightly apart from the disk surface and positioned over the specific track. Recently, a magnetoresistive (MR) head is used as a transducer head. The output resistance of this head changes in response to changes in the magnetic field. This resistance change is converted into a direct current voltage signal by applying a predetermined electric current to the MR head to read data.

A phenomenon called "thermal asperity" may increase the temperature of the MR stripe of an MR head locally by 100° C. or more. This temperature rise is caused by a mechanical collision between a head area containing the MR stripe and a projection on the disk surface. Because a change in resistance of the MR head caused by a change in the magnetic field on a magnetic media resulting from a normal read operation is less than one percent of the MR stripe's resistance, a signal change caused by a temperature rise may substantially exceed the resistance change caused by a normal read signal, preventing the normal read of data.

One prior approach to solve the thermal asperity problem with read data is, when a drastic signal change which is likely to be caused by a thermal asperity occurs, to make an appropriate modification to the read signal so that it can be used as normal read data. Another prior approach is to correct an erroneous read signal by using an appropriate error correction method, such as an error correcting code (ECC) method. However, these approaches have disadvantages. First, additional hardware is required to be added externally. Second, large burst errors unrecoverable by using ECCs cannot be corrected, and eventually must be treated as unreadable hardware error. Thus, these prior approaches do not provide an adequate solution to the thermal asperity problem.

3. Object of the Invention

It is an object of this invention to provide a disk drive apparatus and method whereby, when a thermal asperity is encountered, the projection on the disk which causes the thermal asperity is removed to avoid a subsequent error from being caused by the thermal asperity. This makes it possible to resolve the above mentioned disadvantages of prior thermal asperity counter measures.

SUMMARY OF THE INVENTION

In order to realize the above mentioned and other objects, when a drastic signal change caused by a thermal asperity is detected by the MR head for reading data, or when a data read error occurs, a disk drive apparatus according to this invention lowers the flying height of the signal transducer by changing the disk rotation speed and makes the surface of a component of the signal transducer strike against a projection on the disk to remove it. As one of the data recovery operations, this removes the basic cause of the thermal asperity.

One embodiment of this invention uses a positive pressure signal transducer which increases its flying height as the disk rotation speed increases. In this embodiment, the flying height of the signal transducer is lowered by reducing the disk rotation speed from the normal speed used in read or write operation. The Air Bearing Surface (ABS) side opposite to that on which a MR head is formed, strikes against a projection on the disk to break the projection.

Another embodiment of this invention uses a negative pressure signal transducer which decreases its flying height as the disk rotation speed increases. In this embodiment, the flying height of the signal transducer is lowered by increasing the disk rotation speed from the normal speed in read or write operation. The ABS side opposite to that on which a MR head is formed, strikes against a projection on the disk to break the projection.

Other features and advantages of this invention will become apparent from the following detailed description of the presently preferred embodiment of the invention, taken in conjunction with the accompanying drawings.

DESCRIPTION OF THE PREFERRED EMBODIMENT

Figure 1:
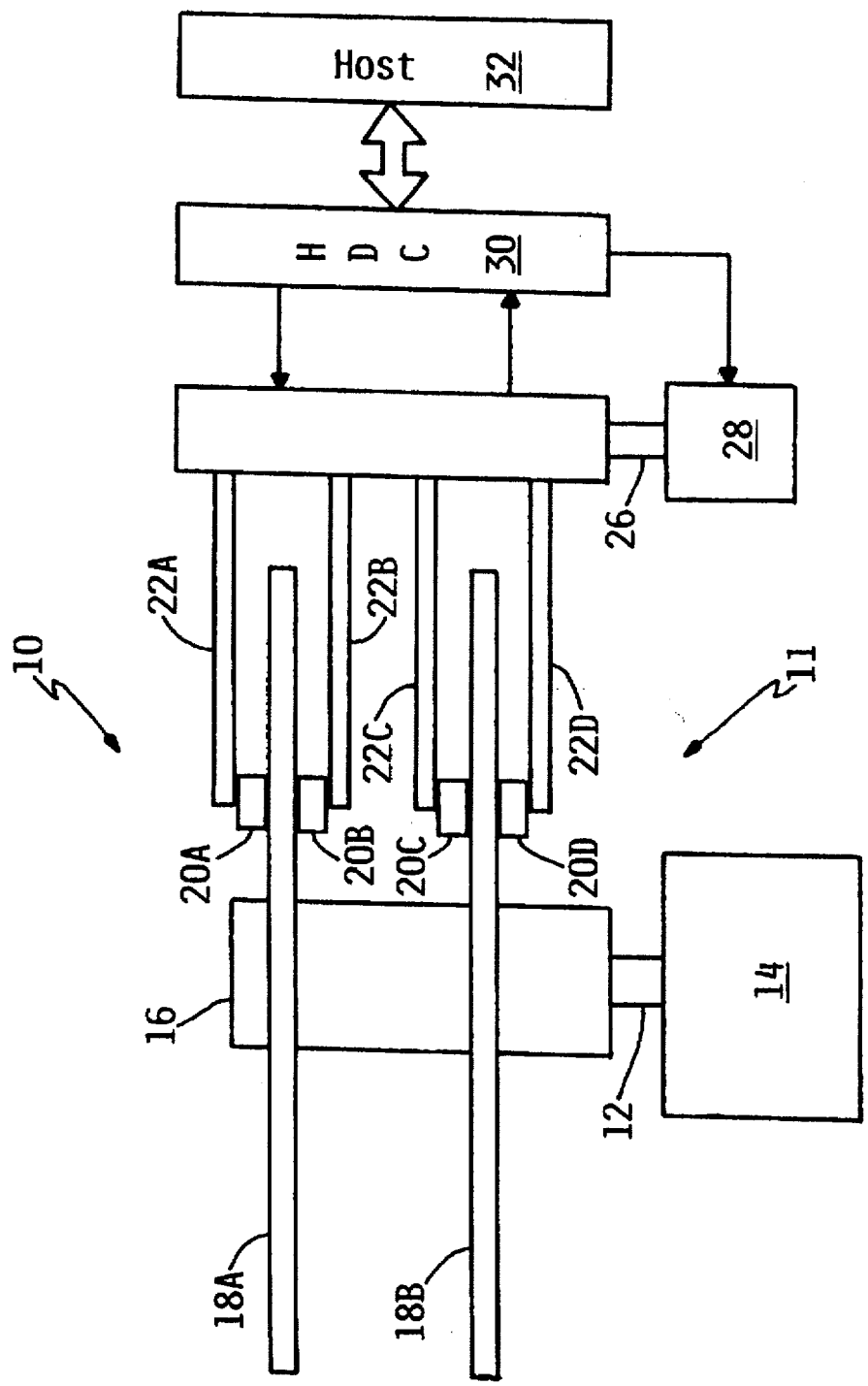
FIG. 1 is a schematic diagram of a disk drive apparatus according to an embodiment of this invention.

FIG. 1 shows a hard disk drive apparatus (HDD) according to an embodiment of this invention. As shown in FIG. 1, the disk drive apparatus 10 comprises a disk assembly 11 and hard disk controller (HDC) 30 containing a local CPU. The disk assembly 11 comprises a disk drive 14 which rotates a shaft 12 at a high speed. A cylindrical holding structure 16 is mounted on the shaft 12 in such a manner that they are concentric with each other. One or more data storage disks for 18A, 18B is mounted on the outer surface of the holding structure 16 at predetermined intervals. The disks 18A, 18B rotate together with the holding structure 16 as one united body when the shaft 12 is rotated by the disk drive 14.

Signal transducers 20A, 20B, 20C, 20D are held by access arms 22A, 22B, 22C, 22D and face each disk surface, respectively. The access arms 22A, 22B, 22C, 22D are connected to an signal transducer drive 28 through a shaft 26. The signal transducers 20A, 20B, 20C, 20D are positioned at a predetermined position by rotation of the shaft 26. The disk drive 14 and signal transducer drive 28 are connected to the HDC 30, and the number of rotations and rotation speed provided by them are controlled by the HDC 30. The HDC 30 can be connected to a host 32.

Figure 2A:
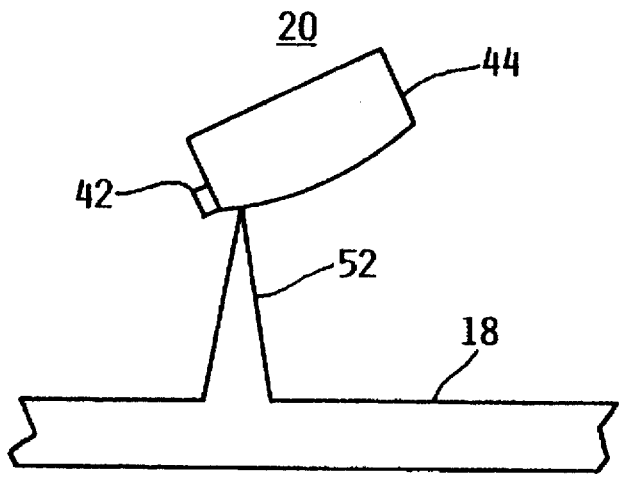
FIGS. 2A, 2B and 2C are diagrams showing states of operation in a disk drive apparatus according to an embodiment of this invention.
Figure 2B:
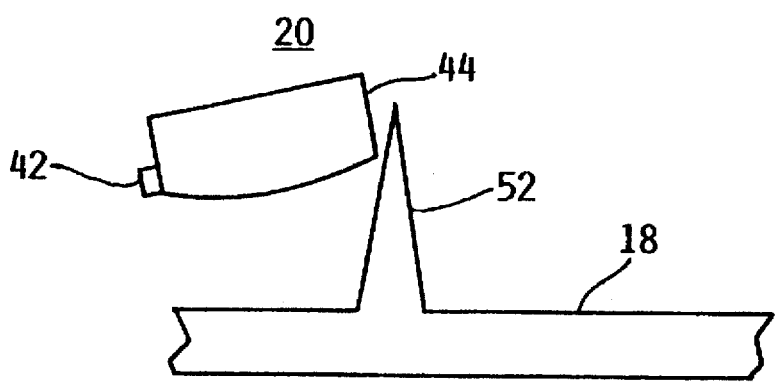
Figure 2C:
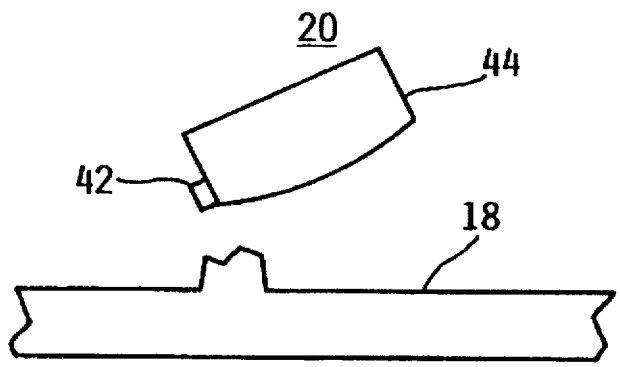

FIGS. 2A, 2B and 2C schematically show how a projection on a data recording surface of the disk is broken by contact with a positive pressure signal transducer according to an embodiment of this invention. FIG. 2A shows the state in which a signal transducer 20 equipped with an MR head 42 contacts a projection 52 on the disk 18 while reading data on the disk 18. The signal transducer 20 includes the MR head 42 and an Air Bearing Surface (ABS) 44 holding the MR head 42. The signal transducer 20 is tilted with respect to the direction of rotation (indicated by arrow F in FIG. 2A) by wind pressure produced by the rotation of the disk. This tilt angle is called the "pitch angle." The pitch angle increases as the number of disk rotations increases. It decreases as the number of disk rotations, and therefore wind pressure, decreases. In FIG. 2A, the closest-to-disk point of the ABS 44 of the signal transducer 20 contacts the projection 52.

Figure 3A:
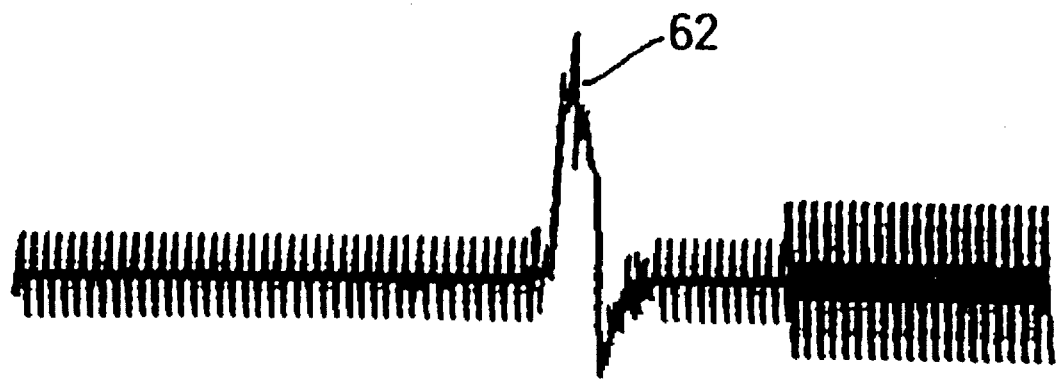
FIGS. 3A and 3B are diagrams showing read signals in a disk drive apparatus according to an embodiment of this invention.

When the signal transducer 20 contacts the projection 52 as shown in FIG. 2A, the temperature of the signal transducer 20 rises as described earlier, and consequently, the resistance of the MR head 42 changes, and the read signal provided by the MR head 42 changes drastically. FIG. 3A shows this change in the read signal. In FIG. 3A, the drastic change point 62 in the signal pattern when the projection is detected is caused by the temperature change of the MR head 42 caused by the projection 52. Such a projection, as described earlier, causes a drastic change in temperature of the head's MR stripe, and is often called a thermal asperity. A read signal produced by a thermal asperity is distinct from normal data signals. Therefore, if a steep read signal which is likely to be caused by a thermal asperity is detected, a data recovery operation is performed.

FIG. 2B shows the positions of the disk 18 and signal transducer 20 when the rate of disk rotation is decreased by the data recovery operation according to an embodiment of this invention. The flying height of the signal transducer 20 is lowered and comes closer to the disk 18. The pitch angle becomes smaller. That is, the signal transducer 20 comes nearer to a position parallel to the disk. As a result, the side of the ABS 44 opposite to that which carries the MR head 42 strikes the projection 52. The strike breaks the projection 52 as shown in FIG. 2C.

For example, the disk rotation speed could be 4870 rpm during read/write operation, and a reduced rotation speed could be set to 2060 rpm. The signal transducer is lowered until its closest point to the disk nearly contacts the surface of the disk. The lowered height depends on the shape and weight of the signal transducer. It is desirable that an appropriate level is selected accordingly. When the signal transducer is lowered, it may remain in read mode or in the off state. For example, approximately 100 msec after the rotation speed reduction is started, the disk is brought into a low speed state, kept at this speed for 2 to 3 seconds, then returned to the normal rotation speed. After returning to the normal rotation speed, the read operation is performed again and the removal of the error is checked.

Figure 3B:

The data recovery operation ends with the break-off of the projection, i.e., thermal asperity, and the disk is returned to its normal rotation speed. When the disk returns to the normal rotation speed, the flying height of the signal transducer increases. FIG. 3B shows the read signal after the data recovery operation. The steep signal change observed in FIG. 3A is eliminated, indicating that the projection (thermal asperity) has been removed.

Figure 4:
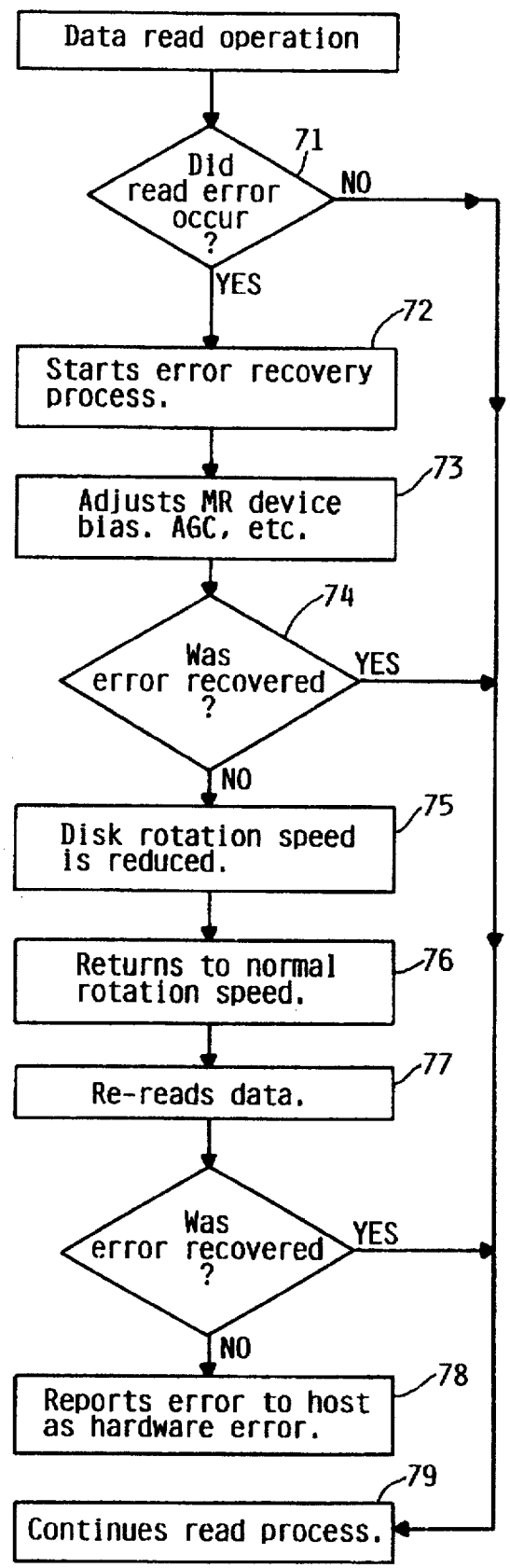
FIG. 4 is a flowchart showing a data recovery method according to an embodiment of this invention.

An embodiment of a data recovery method for removing a projection (thermal asperity) according to the present invention is described below with reference to FIG. 4. FIG. 4 is a flowchart showing an error recovery method according to an embodiment of the present invention. After a read error is detected at step 71, the data error recovery process starts at step 72. At step 73, conventional error recovery processes, for example, bias current change of the MR head, AGC gain adjustment, or some other error recovery processes are performed. After the error recovery processes, the data is re-read and if the data is read successfully, the operation exits the error recovery process routine (step 74) to return to the normal data read operation (step 79).

If the error is not corrected by these conventional steps, the flying height of the signal transducer is changed by changing the disk rotation speed in accordance with this invention. At step 75, the disk speed is reduced, for example, from 4870 rpm to 2060 rpm as mentioned above. After a predetermined period of time, for example, 2 to 3 seconds, the normal rotation speed is returned (step 76). Then, at step 77, the data is re-read and if the data is read successfully, the error recovery process ends to return to the normal read operation (step 79). If the data read still fails, the error is reported as a hardware error to the host (step 78) and an appropriate action, such as data write to an alternative area, is performed.

It will be appreciated that, although specific embodiments of the invention have been described herein for purposes of illustration, various modifications may be made without departing from the spirit and scope of the invention. In particular, the data recovery method for an embodiment using a positive pressure signal transducer is described with reference to the flowchart shown in FIG. 4. In that embodiment, the flying height of the signal transducer decreases as the disk rotation speed decreases. In an embodiment using a negative pressure signal transducer, on the other hand, the disk rotation speed is increased to lower the flying height of the signal transducer. Also, the order of error recovery processes is not limited to the order shown in FIG. 4. For example, an error recovery process for an error cause which occurs most frequently may be performed first. Accordingly, the scope of protection of this invention is limited only by the following claims and their equivalents.

We claim:

1. A disk drive apparatus which rotates a data storage disk and reads data on said disk using a signal transducer floating over said disk, said signal transducer floats at a first flying height over a track on said disk when said disk rotates at a normal rotation speed, said disk drive apparatus comprising:

detecting means for detecting a read error in a read signal output from said signal transducer when said signal transducer is floating at said first flying height over said track on said disk;

speed changing means, responsive to said detecting means detecting a read error, for changing the rotation speed of said disk from said normal rotation speed while said signal transducer is floating over said track to reduce the flying height of said signal transducer from said first flying height and to make said signal transducer strike and break a projection on said disk.

2. A disk drive apparatus as recited in claim 1, wherein: said read error is caused by said signal transducer contacting said projection, and wherein said projection is a thermal asperity.

3. A disk drive apparatus as recited in claim 1, wherein: said signal transducer is a positive pressure signal transducer, wherein said flying height of said positive pressure signal transducer increases as the rotation speed of said disk increases; and said speed changing means reduces said rotation speed of said disk from said normal rotation speed.

4. A disk drive apparatus as recited in claim 1, wherein:
said signal transducer is a negative pressure signal transducer, wherein said flying height of said negative pressure signal transducer decreases as the rotation speed of said disk increases; and
said speed changing means increases said rotation speed of said disk from said normal rotation speed.

5. A disk drive apparatus as recited in claim 2, wherein:
said signal transducer is a positive pressure signal transducer, wherein said flying height of said positive pressure signal transducer increases as the rotation speed of said disk increases; and
said speed changing means reduces said rotation speed of said disk from said normal rotation speed.

6. A disk drive apparatus as recited in claim 2, wherein:
said signal transducer is a negative pressure signal transducer, wherein said flying height of said negative pressure signal transducer decreases as the rotation speed of said disk increases; and
said speed changing means increases said rotation speed of said disk from said normal rotation speed.

7. A disk drive apparatus as recited in claim 1, wherein:
said signal transducer includes a magnetoresistive (MR) head, and said read error is caused when the temperature of said MR head increases when said signal transducer contacts said projection.

8. A disk drive apparatus, comprising:
a disk drive for rotating a data storage disk at a normal rotation speed and another rotation speed;
a signal transducer drive for moving a signal transducer over said disk, said disk drive rotates said disk at said normal rotation speed when said signal transducer is reading data on said disk, and said signal transducer floats at a first flying height over said disk when said disk drive rotates said disk at said normal rotation speed; and
a controller for detecting a read error in a read signal output from said signal transducer when said signal transducer is floating at said first flying height over a track on said disk and for changing the rotation speed of said disk, when said read error is detected, from said normal rotation speed to said another rotation speed while said signal transducer is floating over said track to reduce the flying height of said signal transducer from said first flying height and to make said signal transducer strike and break a projection on said disk.

9. A controller for a disk drive apparatus which rotates a data storage disk and reads data on said disk using a signal transducer floating over said disk, said signal transducer floats at a first flying height over a track on said disk when said disk rotates at a normal rotation speed, said controller comprising:
detecting means for detecting a read error in a read signal output from said signal transducer when said transducer is floating at said first flying height over said track on said disk;
speed changing means, responsive to said detecting means detecting a read error, for changing the rotation speed of said disk from said normal rotation speed while said signal transducer is floating over said track to reduce the flying height of said signal transducer from said first flying height and to make said signal transducer strike and break a projection on said disk.

10. A method for recovering from read errors in disk drive apparatus which rotates a data storage disk and reads data on said disk using a signal transducer floating over said disk, said signal transducer floats at a first flying height over a track on said disk when said disk rotates at a normal rotation speed, said method comprising the steps of:
detecting a read error in a read signal output from said signal transducer when said transducer is floating at said first flying height over said track on said disk; and
changing the rotation speed of said disk, when said read error is detected, from said normal rotation speed while said signal transducer is floating over said track to reduce the flying height of said signal transducer from said first flying height and to make said signal transducer strike and break a projection on said disk.

11. A method for recovering from read errors as recited in claim 10, wherein said read error is caused by said signal transducer contacting a thermal asperity on said disk, said step of changing the rotation speed of said disk including the substep of said signal transducer striking and breaking said thermal asperity.

12. A method for recovering from read errors as recited in claim 10, wherein said signal transducer is a positive pressure signal transducer, wherein said flying height of said positive pressure signal transducer increases as the rotation speed of said disk increases, said step of changing the rotation speed of said disk including the substep of reducing said rotation speed of said disk from said normal rotation speed.

13. A method for recovering from read errors as recited in claim 10, wherein said signal transducer is a negative pressure signal transducer, wherein said flying height of said negative pressure signal transducer decreases as the rotation speed of said disk increases, said step of changing the rotation speed of said disk including the substep of increasing said rotation speed of said disk from said normal rotation speed.

14. A method for recovering from read errors as recited in claim 11, wherein said signal transducer is a positive pressure signal transducer, wherein said flying height of said positive pressure signal transducer increases as the rotation speed of said disk increases, said step of changing the rotation speed of said disk including the substep of reducing said rotation speed of said disk from said normal rotation speed.

15. A method for recovering from read errors as recited in claim 11, wherein said signal transducer is a negative pressure signal transducer, wherein said flying height of said negative pressure signal transducer decreases as the rotation speed of said disk increases, said step of changing the rotation speed of said disk including the substep of increasing said rotation speed of said disk from said normal rotation speed.

16. A method for recovering from read errors as recited in claim 10, wherein said signal transducer includes a magnetoresistive (MR) head, and said read error is caused when the temperature of said MR head increases when said signal transducer contacts a projection on said disk.

* * * * *